United States Patent
Kashiwame et al.

(10) Patent No.: US 10,703,079 B2
(45) Date of Patent: Jul. 7, 2020

(54) DECORATIVE SHEET AND METHOD OF PRODUCING THE SAME

(71) Applicant: TOPPAN PRINTING CO., LTD., Tokyo (JP)

(72) Inventors: Megumi Kashiwame, Tokyo (JP); Masashi Hattori, Tokyo (JP); Tatsuhiko Furuta, Tokyo (JP); Masamitsu Nagahama, Tokyo (JP); Akira Sato, Tokyo (JP); Masatoshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 94 days.

(21) Appl. No.: 16/135,262

(22) Filed: Sep. 19, 2018

(65) Prior Publication Data

US 2019/0016104 A1    Jan. 17, 2019

Related U.S. Application Data

(63) Continuation of application No. PCT/JP2017/012188, filed on Mar. 24, 2017.

(30) Foreign Application Priority Data

Mar. 24, 2016  (JP) ................. 2016-059906

(51) Int. Cl.
C08L 23/12 (2006.01)
B32B 27/32 (2006.01)
B32B 7/12 (2006.01)
B32B 27/08 (2006.01)
B32B 27/18 (2006.01)

(52) U.S. Cl.
CPC .............. *B32B 27/32* (2013.01); *B32B 7/12* (2013.01); *B32B 27/08* (2013.01); *B32B 27/18* (2013.01); *C08L 23/12* (2013.01); *B32B 2307/412* (2013.01); *B32B 2307/54* (2013.01); *B32B 2307/584* (2013.01); *B32B 2307/704* (2013.01); *B32B 2451/00* (2013.01); *C08L 2205/025* (2013.01); *Y02P 20/544* (2015.11)

(58) Field of Classification Search
CPC ......... B32B 27/18; B32B 27/32; B32B 27/08; B32B 7/12; B32B 2451/00; B32B 2307/412; B32B 2307/584; B32B 2307/704; B32B 2307/54; C08L 23/12; C08L 23/16; C08L 2205/025; C08K 5/17; Y02P 20/544

See application file for complete search history.

(56) References Cited

U.S. PATENT DOCUMENTS

| 8,512,828 B2 * | 8/2013 | Tanaka et al. ......... B32B 27/08 428/32.5 |
| 2013/0323995 A1 | 12/2013 | Koori et al. |
| 2015/0274949 A1 * | 10/2015 | Fujii et al. ............... C09K 3/16 252/500 |

FOREIGN PATENT DOCUMENTS

| EP | 2 671 993 A1 | 12/2013 |
| JP | H02-128843 A | 5/1990 |
| JP | H06-198831 A | 7/1994 |
| JP | 3175482 B2 | 6/2001 |
| JP | 3185590 B2 | 7/2001 |
| JP | 2001-270054 A | 10/2001 |
| JP | 3567899 B2 | 9/2004 |
| JP | 3772634 B2 | 5/2006 |
| JP | 2007-100045 A | 4/2007 |
| JP | 2013-122020 A | 6/2013 |
| JP | 2016-030825 A | 3/2016 |

OTHER PUBLICATIONS

International Search Report regarding International Application No. PCT/JP2017/012188, dated Jun. 13, 2017, 2 pps.
Extended European Search Report issued on 17770450.9-1102/3434727, dated Aug. 14, 2019 (6 pages).

* cited by examiner

*Primary Examiner* — Nathan M Nutter
(74) *Attorney, Agent, or Firm* — Foley & Lardner LLP

(57) ABSTRACT

A decorative sheet that has a transparent resin layer having good V groove bending processability (post-processability) while maintaining high scratch resistance and transparency and a method of producing the decorative sheet. A decorative sheet (1) according to the present embodiment is a decorative sheet including at least a transparent resin layer (3) containing a highly crystalline polypropylene resin as a main component. The transparent resin layer (3) contains a low crystalline polypropylene resin added thereto in the range of 0.1 part by mass or more and 20 parts by mass or less relative to 100 parts by mass of the highly crystalline polypropylene resin, the low crystalline polypropylene resin having a tensile modulus in the range of 25 MPa or more and 500 MPa or less.

9 Claims, 1 Drawing Sheet

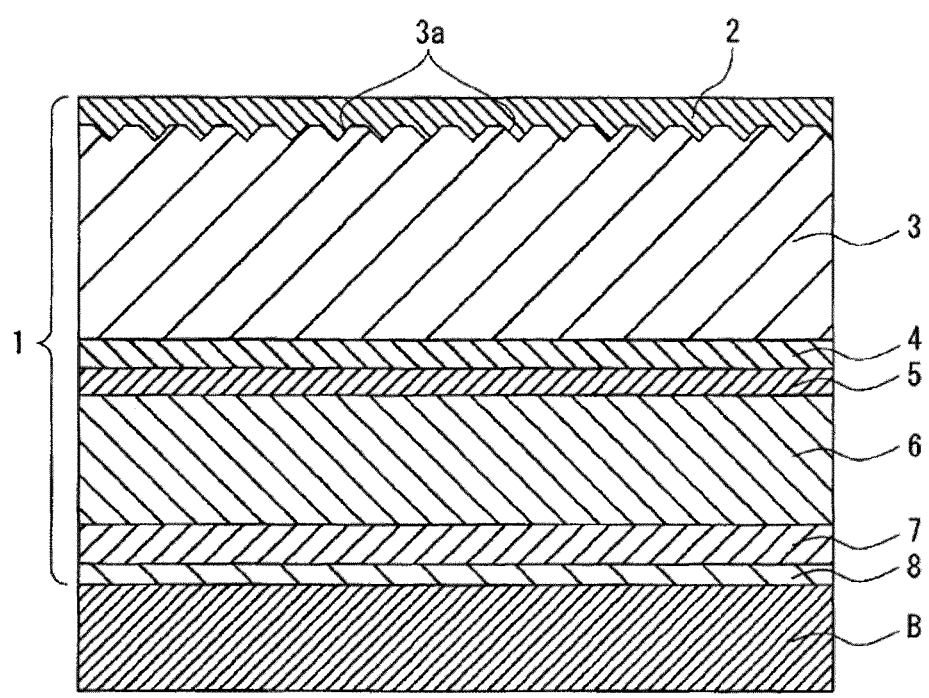

DECORATIVE SHEET AND METHOD OF PRODUCING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/012188, filed on Mar. 24, 2017, which is based upon and claims the benefit of priority to Japanese Patent Application No. 2016-059906, filed on Mar. 24, 2016, the disclosures of which are all hereby incorporated herein by reference in their entireties.

TECHNICAL FIELD

The present invention relates to a decorative sheet used for interior decoration materials of buildings, surface materials for fixtures, surface materials for home appliances, and the like, and a method of producing the decorative sheet. The decorative sheet is bonded to a substrate such as a wooden board, inorganic board, or metal board to be used as a decorative board.

BACKGROUND ART

In recent years, various decorative sheets have been proposed as disclosed in PTLs 1 and 2. Such a decorative sheet uses an olefin-based resin and serves as an alternative decorative sheet to a polyvinyl chloride decorative sheet. Since such a decorative sheet is not made of a vinyl chloride resin, the generation of toxic gas and the like during incineration is reduced or prevented.

However, these conventional decorative sheets, which are made of an olefin-based resin and use a general polypropylene sheet, have poor surface scratch resistance and are inferior in scratch resistance to the conventional polyvinyl chloride decorative sheets.

In this regard, to solve these drawbacks, the inventors of the present invention proposed a decorative sheet having high scratch resistance of the surface as disclosed in PTL 3. However, along with the increase in the use of decorative boards using such a decorative sheet, consumers are paying more and more attention to their quality. Therefore, the decorative sheets are required to be improved in quality as well as scratch resistance. Particularly, improvement in post-processing resistance such as V groove bending is sought.

In this regard, as a decorative sheet having improved post-processability, decorative sheets as disclosed in PTLs 4 to 6 are proposed. Such decorative sheets include a transparent resin layer containing a random copolymerized polypropylene resin to which a soft component is added. Such decorative sheets; however, have an issue of deteriorating scratch resistance due to the flexibility of the sheet associated with the improvement in post-processability.

CITATION LIST

Patent Literature

[PTL 1] JP H02-128843 A; [PTL 2] JP H06-198831 A; [PTL 3] JP 3772634 B2; [PTL 4] JP 3185590 B2; [PTL 5] JP 3567899 B2; [PTL 6] JP 3175482 B2

SUMMARY OF THE INVENTION

Technical Problem

The present invention has been made in view of the above circumstances and has an object to provide a decorative sheet that includes a transparent resin layer having good V groove-bending processability (post-processability) while maintaining improved or high scratch resistance and transparency, and a method of producing the decorative sheet.

Intended Solution to Problem

The present inventors conducted thorough studies to improve or solve this issue and found that a transparent resin layer having good post-processability while keeping high scratch resistance and transparency is obtained by adding 0.1 to 20 parts by mass of a low crystalline polypropylene resin having a tensile modulus in the range of 25 to 500 MPa to a transparent resin layer containing a highly crystalline polypropylene resin as a main component.

An aspect of the present invention that improves or solve the issue is a decorative sheet that includes at least a transparent resin layer containing a highly crystalline polypropylene resin as a main component.

In the decorative sheet, the transparent resin layer contains a low crystalline polypropylene resin added thereto in the range of 0.1 part by mass or more and 20 parts by mass or less relative to 100 parts by mass of the highly crystalline polypropylene resin, the low crystalline polypropylene resin having a tensile modulus in the range of 25 MPa or more and 500 MPa or less.

Another aspect of the present invention is a method of producing a decorative sheet. In the method, the transparent resin layer is formed by adding a nanoscale nucleating agent to the highly crystalline polypropylene resin.

Desired Advantageous Effects of the Invention

According to the aspects of the present invention, the transparent resin layer contains the highly crystalline polypropylene resin as a main component, thereby increasing surface strength (scratch resistance) of the decorative sheet.

Further, since the low crystalline polypropylene resin has high compatibility with the highly crystalline polypropylene resin, addition of the low crystalline polypropylene resin having the aforementioned range of tensile modulus to the transparent resin layer can make the transparent resin layer sufficiently transparent and can improve post-processability. Moreover, by setting the amount of the low crystalline polypropylene resin to be within the aforementioned range, a decorative sheet having good scratch resistance and post-processability can be obtained.

In addition, by forming the transparent resin layer by adding a nanoscale nucleating agent to the highly crystalline polypropylene resin, a degree of crystallinity of the highly crystalline polypropylene resin increases. Accordingly, a decorative sheet having extremely high transparency can be obtained, and the scratch resistance and the post-processability of the decorative sheet further increases.

BRIEF DESCRIPTION OF THE DRAWINGS

The FIGURE is a diagram illustrating a configuration of a decorative sheet and a decorative board according to an embodiment of the present invention.

DESCRIPTION OF REPRESENTATIVE EMBODIMENTS

Next, representative embodiments of the present invention will be described with reference to the drawing.

Since the drawing is schematic, the relationship between thickness and planar dimension, the thickness ratio between layers, and the like, are not to scale. The embodiments described below are merely representative examples of configurations for embodying the technical idea of the present invention, and the technical idea of the present invention should not limit the materials, shapes, structures, and the like of the components to those described below. The technical idea of the present invention can be modified in various ways within the technical scope defined by the claims.

A decorative sheet 1 of the present embodiment has a substrate layer 6 on which a plurality of resin layers is laminated on the front surface side of the substrate layer 6. A transparent resin layer 3 is arranged as a resin layer among the plurality of resin layers on the front surface side. Specifically, as illustrated in the FIGURE, the decorative sheet 1 of the present embodiment has the substrate layer 6 configuring a primary film layer. The substrate layer 6 has one surface (front surface) on which a pattern layer 5, the transparent resin layer 3, and a surface protective layer 2 are laminated in this order. A reference sign 4 indicates an adhesive layer.

The substrate layer 6 has the other side (back surface) on which a concealing layer 7 and a primer layer 8 are formed in this order. The concealing layer 7 may be formed between the substrate layer 6 and the pattern layer 5 or may be omitted.

In the decorative sheet 1 having the above configuration, the thickness of each layer is set considering, for example, print workability, costs, and the like. Specifically, the surface protective layer 2 is set to have a thickness in the range of 3 to 20 μm, the transparent resin layer 3 is set to have a thickness in the range of 20 to 200 μm, the adhesive layer 4 is set to have a thickness in the range of 1 to 20 μm, the pattern layer 5 is set to have a thickness in the range of 3 to 20 μm, the substrate layer 6 is set to have a thickness in the range of 20 to 150 μm, the concealing layer 7 is set to have a thickness in the range of 2 to 20 μm, and the primer layer 8 is set to have a thickness in the range of 0.1 to 20 μm. Thus, the decorative sheet 1 is set to have a total thickness in the range of 49 to 450 μm.

The FIGURE shows an example of bonding the decorative sheet 1 onto a substrate B to configure a decorative board of the present embodiment.

<Substrate Layer 6>

The substrate layer 6 is made such as of paper, a resin sheet, or a foil. Examples of the paper may include thin paper, titanium paper, resin-impregnated paper, organic or inorganic nonwoven fabric, and synthetic paper. Examples of the resin for the resin sheet may include: synthetic resins, such as polyethylene, polypropylene, polybutylene, polystyrene, polycarbonate, polyester, polyamide, an ethylene-vinyl acetate copolymer, polyvinyl alcohol, and acryl, or a foam of these synthetic resins; or rubber, such as ethylene-propylene copolymer rubber, ethylene-propylene-diene copolymer rubber, styrene-butadiene copolymer rubber, styrene-isoprene-styrene block copolymer rubber, styrene-butadiene-styrene block copolymer rubber, and polyurethane. Examples of the foil may include metal foils made such as of aluminum, iron, gold, or silver.

<Pattern Layer 5>

The pattern layer 5 may be provided using a known printing technique. When the substrate layer 6 is prepared in a rolled state, the pattern layer 5 may be formed by a printing device using a roll-to-roll process. The printing technique is not particularly limited, and for example, gravure printing may be used considering productivity and quality of the design.

For the pattern, an arbitrary pattern may be employed considering desired design for areas, such as a floor and a wall. In the case where a wooden pattern is applied to the pattern layer 5, various types of grain patterns are often preferably employed. Besides grain patterns, a cork board pattern may also be employed. For example, in the case where a pattern representing a floor of stone, such as marble, a pattern of marble stone grain and the like may also be used. In addition to the patterns of such natural materials, an artificial pattern such as an artificial pattern or a geometric pattern in the motif of the natural materials may be used as well.

The printing ink is not particularly limited, and is suitably selected depending on the printing method. Specifically, the ink is preferably selected considering adhesion and printability to the substrate layer 6 made of resin, weatherbility as a decorative material, and the like.

To the printing ink, a pigment, a colorant such as a dye, an extender pigment, a solvent, and a binder contained in normal ink are added as appropriate. Examples of the pigment may include condensed azo pigment, insoluble azo pigment, quinacridone, isoindoline, anthraquinone, imidazolone, cobalt, phthalocyanine, carbon, titanium oxide, iron oxide, pearl pigments of mica, and the like. The binder may be any of aqueous, solvent, and emulsion types. Examples of the curing method include, but are not limited to, a one-part type or a two-part type that uses a main agent and curing agent, and a type in which ink is cured by irradiation with ultraviolet rays, electron beams, or the like. In particular, the most typical method is a two-part type that use a urethane-based main agent and an isocyanate curing agent. In addition, the design may be applied by vapor deposition or sputtering of various types of metal.

<Adhesive Layer 4>

The adhesive layer 4 is provided to firmly bond the substrate layer 6 and the pattern layer 5 onto the transparent resin layer 3. When these layers are firmly bonded to each other, the decorative sheet 1 can obtain bending processability of following curved surfaces and right-angle surfaces. The adhesive layer 4 is preferably transparent.

The adhesive layer 4 may be made of arbitrary material to perform bonding, and may be laminated by heat lamination, extrusion lamination, dry lamination, or the like. An adhesive used for the adhesive layer 4 may be appropriately selected from acrylic, polyester, polyurethane, epoxy-based adhesives, and the like. As a normal two-part curing type, a urethane-based material obtained by reaction of isocyanate with polyol desirably used in particular due to its cohesive force. The adhesive layer 4 may be omitted when bonding strength between the transparent resin layer 3 and the pattern layer 5 is sufficiently obtained.

<Transparent Resin Layer 3>

The transparent resin layer 3 is produced as, for example, a transparent resin sheet to be laminated.

The transparent resin layer 3 contains a highly crystalline polypropylene resin as a main component. The main component herein refers to a component contained in the resin configuring, for example, the transparent layer 3, in the range of 80 to 100 parts by mass, and preferably in the range of 90 to 100 parts by mass.

The transparent resin layer 3 of the present embodiment contains a low crystalline polypropylene resin added thereto in the range of 0.1 to 20 parts by mass relative to 100 parts by mass of the highly crystalline polypropylene resin, the low crystalline polypropylene resin having a tensile modulus in the range of 25 MPa or more and 500 MPa or less. The tensile modulus is more preferably in the range of 50 to 120 MPa.

[Highly Crystalline Polypropylene Resin]

The highly crystalline polypropylene resin, which is the main component of the transparent resin layer 3 may be appropriately selected and designed from, for example, isotactic polypropylene and syndiotactic polypropylene having different pentad fractions, random polypropylene, block polypropylene, and a mixture thereof. In the present embodiment, the highly crystalline polypropylene resin is preferably a highly crystalline homopolypropylene resin that is a propylene homopolymer having a pentad fraction (mmmm fraction) of 95% or more and, more preferably 96% or more.

The pentad fraction (mmmm fraction) is calculated from a numerical value (electromagnetic absorptivity) obtained using $^{13}$C-NMR spectroscopy (nuclear magnetic resonance spectroscopy) analysis of a resin composition configuring the transparent resin layer 3 at a predetermined resonance frequency using carbon C (nuclide) having a mass number of 13. The pentad fraction (mmmm fraction) defines the atomic arrangement, the electronic structure, and the fine structure of a molecule in the resin composition. The pentad fraction of the polypropylene resin is the ratio of five propylene units in a row determined by $^{13}$C-NMR, and it is used as a measure of crystallinity or stereoregularity. Such a pentad fraction is one of the important factors that mainly determine the scratch resistance of the surface. In principle, the higher the pentad fraction, the higher the degree of crystallinity of the sheet, thereby improving the scratch resistance.

The transparent resin layer 3 contains the highly crystalline polypropylene resin as a main component, thereby increasing the surface strength (scratch resistance) of the decorative sheet.

[Low Crystalline Polypropylene Resin]

The low crystalline polypropylene resin to be added to the transparent resin layer 3 is preferably a polypropylene resin satisfying at least one of the following characteristics:

a meso pentad fraction in the range of 20% to 60%
(more preferably in the range of 40% to 55%);
a MFR at 230° C. in the range of 30 to 100
(more preferably in the range of 30 to 60);
a mass-average molecular weight (Mw) in the range of 10,000 to 500,000
(more preferably in the range of 50,000 to 200,000);
a molecular weight distribution (Mw/Mn) of less than 4; and
a melting point in the range of 0° C. to 120° C. (more preferably in the range of 40° C. to 100° C.), the melting point being defined as a peak top of a peak observed on a highest temperature side of a melting endothermic curve obtained by being held at −10° C. for five minutes under a nitrogen atmosphere using a differential scanning calorimeter (DSC), followed by a temperature rise at 10° C./min.

The low crystalline polypropylene resin has a tendency of performance including low crystallinity, softness, a lower melting point, and high solubility in solvents. Employment of such a low crystalline polypropylene resin causes no influence or greatly reduces influence on the degree of crystallinity of the highly crystalline polypropylene resin while having performance of high compatibility and slowing of crystallization rate when being added to the highly crystalline polypropylene resin.

[Nucleating Agent]

The transparent resin layer 3 preferably contains a nanoscale nucleating agent added thereto. In particular, such a nanoscale nucleating agent is preferably added as a nucleating agent vesicle having a single layer membrane containing a nucleating agent.

By adding the nucleating agent vesicle to the highly crystalline polypropylene resin, a degree of crystallinity of the highly crystalline polypropylene resin increases. Therefore, a transparent resin sheet having extremely high transparency can be obtained. That is, by adding the nanoscale nucleating agent, the scratch resistance further increases.

The nucleating agent vesicle can be prepared by the Bangham method, extrusion, hydration, detergent dialysis, reverse phase evaporation, freeze-thaw, supercritical reverse phase evaporation, and the like. Among these method, supercritical reverse phase evaporation is more preferred.

The supercritical reverse phase evaporation is a method of preparing a nanoscale vesicle (capsule) containing a target substance using carbon dioxide in a supercritical state, or under a temperature or pressure condition that is equal to or exceeds the critical point. Carbon dioxide in a supercritical state refers to carbon dioxide that is in a supercritical state with a temperature that is equal to or higher than the critical temperature (30.98° C.) and a pressure that is equal to or higher than the critical pressure (7.3773±0.0030 MPa). Carbon dioxide under a temperature condition that is equal to or exceeds the critical point or a pressure condition that is equal to or exceeds the critical point indicates carbon dioxide under conditions where only one of the critical temperature and the critical pressure exceeds the critical condition.

Specifically, an aqueous phase is injected into a mixture fluid of carbon dioxide in a supercritical state, phospholipid, and a nucleating agent as an encapsulated substance, and an emulsion of carbon dioxide in a supercritical state and the aqueous phase is formed by stirring. Then, once the pressure is reduced, the carbon dioxide expands and evaporates to cause phase transition, and nanovesicles are formed in which the phospholipid in the form of a monolayer membrane covers the surface of the nucleating agent nanoparticle. According to this supercritical reverse phase evaporation method, a vesicle with a single layer membrane can be formed, and therefore an extremely small vesicle can be obtained.

The average particle diameter of the nucleating agent vesicles containing a nanoscale nucleating agent is preferably half or less of the visible light wavelength (in the range of 400 nm to 750 nm), more specifically, in the range of 200 nm to 375 nm or less. Setting the particle diameter of the nucleating agent to the extremely small size within the above range, light scattering can be reduced, and thus the transparent resin layer 3 having high transparency by reducing light scattering can be provided.

The nucleating agent is not particularly limited as long as it is a substance to be a starting point for crystallization upon crystallization of the resin. Examples of the nucleating agent may include phosphoric acid ester metal salts, benzoic acid metal salts, pimelic acid metal salts, rosin metal salts, benzylidene sorbitol, quinacridone, cyanine blue, and talc. In particular, to maximize the effect of nanoization, phosphoric ester metal salt, benzoic acid metal salt, pimelic acid metal salt, and rosin metal salt are preferably used because they are non-melting and good transparency is expected. When the material itself can be transparentized by nanoization, quinacridone, cyanine blue, talc, and the like, which are colored, may be used as well. The non-melting nucleating agent may be used by being appropriately mixed with melting benzylidene sorbitol.

As described above, one of the features (matters defining the invention) of the decorative sheet of the present embodiment is that "the transparent resin layer includes a nucleating agent contained in a vesicle". The nucleating agent in the state of being contained in the vesicle is then added to the resin composition, thereby exhibiting the effect of drastically improving dispersibility of the nucleating agent in the resin material, that is, in the transparent resin layer. However, direct specification of such a feature from the structure or the properties of the object in the state of the completed decorative sheet may be assumed to be difficult depending on the situation and may be considered to be impractical. The reasons are as follows. The nucleating agent added in the state of vesicles is in a dispersed condition with high dispersibility, and the nucleating agent in the state of the prepared decorative sheet is also highly dispersed in the transparent resin layer. In the preparing step of the decorative sheet after preparing a transparent resin layer by adding the nucleating agent in the form of vesicles to the resin composition configuring the transparent resin layer, the laminate is normally subjected to various types of processing, such as compression and curing. However, due to such a processing, the outer membrane of the vesicle containing the nucleating agent may be crushed or chemically reacted, which may cause a high risk of the nucleating agent not to be contained (sheathed) in an outer membrane. This is because the state of crushing or chemical reaction in the outer membrane varies depending on the processing of the decorative sheet. The situation, such as that the nucleating agent is not contained in an outer membrane, is difficult to specify by the characteristics themselves using a numerical range. Further, a component of the crushed outer membrane may be difficult to determine as either the outer membrane of the vesicle or a material added separately from the nucleating agent. Thus, compared to conventional art, while the present invention is different in the nucleating agent is blended in a highly dispersed condition, specification in a numerical range analyzed based on measurement of the structure and the properties in the decorative sheet may be assumed to be impractical due to addition in the state of vesicles containing the nucleating agent.

<Surface Protective Layer 2>

On an outermost surface of the decorative sheet 1, the surface protective layer 2 is provided that plays roles of surface protection and gloss control.

A material for the surface protective layer 2 may be selected as appropriate from polyurethane-based materials, acrylic silicon-based materials, fluorine-based materials, epoxy-based materials, vinyl-based materials, polyester-based materials, melamine-based materials, aminoalkyd-based materials, urea-based materials, and the like. The form of the material is not limited, and it may be, for example, aqueous, emulsion, or solvent type. The curing method may be appropriately selected from a one-part type, a two-part type, an ultraviolet curing method, and the like.

In particular, a main component of the surface protective layer 2 is preferably a urethane-based one having isocyanate in view of workability, cost, cohesive force of the resin itself, and the like. The isocyanate may be appropriately selected from tolylene diisocyanate (TDI), xylylene diisocyanate (XDI), hexamethylene diisocyanate (HMDI), diphenylmethane diisocyanate (MDI), lysine diisocyanate (LDI), isophorone diisocyanate (IPDI), methylhexane diisocyanate (HTDI), methylcyclohexanone diisocyanate (HXDI), trimethylhexamethylene diisocyanate (TMDI), and the like, and considering weatherbility, hexamethylene diisocyanate (HMDI) having a linear molecular structure is preferred. In addition, in order to improve surface hardness, resins to be cured with ionizing radiation beams, such as ultraviolet and electron beams, are preferably used. Moreover, these resins may be used in combination. For example, use of a hybrid of thermally curable resin and a photo-curable resin can improve surface hardness, reduce cure shrinkage, and enhance adhesion.

<Concealing Layer 7>

The concealing layer 7 is formed to keep concealability by, for example, printing in the same manner as the pattern layer 5. As the pigment to be contained in the ink, opaque pigment, titanium oxide, iron oxide, or the like is preferably used. Further, in order to improve concealability, it is also possible to add metal, such as gold, silver, copper, and aluminum. In general, flaky aluminum is often added. The concealing layer 7 may be omitted when the substrate layer 6 is opaque and has concealability.

<Primer Layer 8>

The primer layer 8 is formed to improve adhesion to the substrate B.

When the substrate B is a wooden substrate B, examples of the primer layer 8 may include an ester-based resin, a urethane-based resin, an acrylic-based resin, a polycarbonate-based resin, a vinyl chloride-vinyl acetate copolymer, a polyvinyl butyral-based resin, a nitrocellulose-based resin, and the like. These resins may be used singly or in combination as an adhesive composition, and may be formed using an appropriate application technique, such as roll coating and gravure printing. In this case, the resin configuring the primer layer 8 is preferably a urethane acrylate-based resin, that is, particularly preferred to be formed by a resin made of isocyanate and a copolymer of an acrylic-based resin and a urethane-based resin.

Advantageous Effects of the Present Embodiment (1) To the transparent resin layer 3 containing the highly crystalline polypropylene resin as a main component, the low crystalline polypropylene resin having a tensile modulus in the range according to the present embodiment is added in the range according to the present embodiment.

Since the low crystalline polypropylene resin has high compatibility with the highly crystalline polypropylene resin, high transparency can be imparted to the transparent resin layer 3.

Further, the low crystalline polypropylene resin is added in the amount in the range according to the present embodiment, thereby obtaining a decorative sheet having good scratch resistance and post-processability.

(2) The low crystalline polypropylene resin has a meso pentad fraction in the range of 20% to 60%.

By setting meso pentad fraction to be in the range of 20% to 60%, delay of solidification during melt extrusion is prevented, and thus, the transparent resin layer 3 formed is prevented from being sticky.

(3) The low crystalline polypropylene resin has a MFR at 230° C. in the range of 30 to 100.

The low crystalline polypropylene resin has a MFR in the aforementioned range, thereby moderating the fluidity of the low crystalline polypropylene resin and allowing film formation by a melt extruder without problems.

(4) The low crystalline polypropylene resin has a mass-average molecular weight (Mw) in the range of 10,000 to 500,000.

The low crystalline polypropylene resin has a mass-average molecular weight in the aforementioned range, thereby moderating the viscosity of the low crystalline polypropylene resin and allowing film formation during melt extrusion without problems.

(5) The low crystalline polypropylene resin has a molecular weight distribution (Mw/Mn) of less than 4.

By setting the molecular weight distribution to be within the aforementioned range, reduction of film formability of the transparent resin layer 3 is prevented.

(6) The low crystalline polypropylene resin has a melting point in the range of 0° C. to 120° C., the melting point being defined as a peak top of a peak observed on a highest temperature side of a melting endothermic curve obtained by being held at −10° C. for five minutes under a nitrogen atmosphere using a differential scanning calorimeter (DSC), followed by a temperature rise at 10° C./min.

Use of such a low crystalline polypropylene resin can reduce or prevent bleeding of additives contained in the transparent resin layer 3.

(7) The transparent resin layer 3 contains a nanoized nucleating agent added thereto.

The nucleating agent is nanoized to significantly improve the dispersibility of the nucleating agent to the transparent resin layer 3. Accordingly, the scratch resistance can be improved while maintaining the transparency and the post-processability.

(8) The transparent resin layer 3 is formed by adding a nanoized nucleating agent to the highly crystalline polypropylene resin.

The nucleating agent is nanoized to significantly improve the dispersibility of the nucleating agent to the transparent resin layer 3. Accordingly, the scratch resistance can be improved while maintaining the transparency and the post-processability.

(9) The nucleating agent is a nucleating agent vesicle having a single layer outer membrane containing a nucleating agent.

The vesicle contains a nucleating agent, thereby further improving the dispersibility of the nucleating agent to the transparent resin layer 3. Accordingly, the scratch resistance can further be improved while maintaining the transparency and the post-processability.

(10) The nucleating agent is contained in the vesicle by supercritical reverse phase evaporation.

By using supercritical reverse phase evaporation, the nucleating agent can reliably be contained in the vesicle.

Example 1

Examples of the present invention will be described.

Examples 1 to 22

For each Example, a decorative sheet 1 was prepared, which includes a transparent resin layer 3 to which a low crystalline polypropylene resin has been added relative to 100 parts by mass of a highly crystalline polypropylene resin, which is the main component of the transparent resin layer 3 as shown in Table 1.

Each decorative sheet was basically produced in the following method.

As the highly crystalline polypropylene resin, a highly crystalline homopolypropylene resin was used that has a pentad fraction of 97.8%, a MFR (melt flow rate) of 15 g/10 min. (230° C.), and a molecular weight distribution (MWD) (Mw/Mn) of 2.3.

To the highly crystalline polypropylene resin, 500 PPM of a hindered phenol-based antioxidant (Irganox 1010: produced by BASF SE), 2000 PPM of a benzotriazole-based ultraviolet absorber (Tinuvin 328: produced by BASF SE), 2000 PPM of a hindered amine-based light stabilizer (Chimassorb 944: produced by BASF SE), and a low crystalline polypropylene resin were added, followed by extruding the resin using a melt extruder to form a transparent resin sheet made of a highly crystalline polypropylene resin with a thickness of 80 μm to be used as the transparent resin layer 3.

Corona treatment was applied on both surfaces of the transparent resin sheet thus obtained so that the wet tension of surface of the transparent resin sheet becomes 40 dyn/cm or higher. On the other hand, a pattern was printed on one of the surfaces of 70 μm-thick polyethylene sheet (substrate layer 6) having concealability by gravure printing using a two-part type urethane ink (V180; produced by Toyo Ink Manufacturing Co., Ltd.) to which a hindered amine-based photostabilizer (CHIMASSORB 944; produced by BASF Corp.) in the range of 0.5 mass % was added relative to the amount of binder resin of the above ink, thereby provide the pattern layer 5.

The substrate layer 6 has the other surface provided with a primer layer 8. After that, the transparent resin sheet was bonded to one of the surfaces of the substrate layer 6 by dry lamination via a dry lamination adhesive (TAKELAC A540; manufactured by Mitsui Chemicals, Inc., applied amount 2 g/m²) which is the adhesive layer 4. After an embossed pattern 3a was formed on the surface of the transparent resin sheet, a two-part curing type urethane top coat (W184; manufactured by DIC Graphics Corp.) was applied at the applied amount 6 g/m² to form a surface protective layer 2 and thus obtain a decorative sheet having a total thickness of 170 μm of the present invention illustrated in the FIGURE.

In each Example, the low crystalline polypropylene resin was added as shown in Table 1.

In Examples 17 and 21, a nanoized nucleating agent was added. As the nanoized nucleating agent, a nucleating agent vesicle was used in which vesicles were formed by supercritical reverse phase evaporation as described later.

That is, the resin composition forming the transparent resin layer was prepared using supercritical reverse phase evaporation in the following manner.

First, in a method of forming vesicles of the nucleating agent using supercritical reverse phase evaporation, 100 parts by mass of methanol, 82 parts by mass of a phosphoric ester metal salt-based nucleating agent (ADK STAB NA-11, produced by ADEKA Corp.) as a nucleating agent, and 5 parts by mass of phosphatidyl choline as a substance configuring an outer membrane of the vesicle were put into a high-pressure stainless steel container kept at 60° C. and the container was tightly closed. Carbon dioxide was then injected to a pressure of 20 MPa to be in a supercritical state, followed by vigorous stirring and mixing while injecting 100 parts by mass of ion exchanged water After stirring for 15 minutes while keeping the temperature and the pressure in the container in a supercritical state, carbon dioxide was discharged to return to atmospheric pressure, thereby obtaining a nucleation liposome including an outer membrane of phospholipid encapsulating the nucleating agent. For formation of a transparent resin sheet as the transparent resin layer 3 in practice, 500 PPM of a hindered phenol-based antioxidant (Irganox 1010: produced by BASF SE), 2000

PPM of a benzotriazole-based ultraviolet absorber (Tinuvin 328: produced by BASF SE), 2000 PPM of a hindered amine-based light stabilizer (Chimassorb 944: produced by BASF SE), and 1000 PPM of the nucleation liposome were added to a highly crystalline homopolypropylene resin having a pentad fraction of 97.8%, a MFR (melt flow rate) of 15 g/10 min. (230° C.), and a molecular weight distribution MWD (Mw/Mn) of 2.3, followed by extruding the resin using a melt extruder for film formation of a transparent resin sheet made of a highly crystalline polypropylene resin with a thickness of 80 μm used as the transparent resin layer 3.

In this context, a vesicle having an outer membrane configured with biogenic lipid, such as phospholipid, is referred to as a liposome.

Comparative Examples 1 to 7

Each decorative sheet was produced in Comparative Example by setting the presence and the configuration of a low crystalline polypropylene resin and the presence of a nucleating agent as shown in Table 2. For the other aspects, it was produced in the same manner as in Examples.

TABLE 1

| Example/Comparative Example | Tensile Modulus [MPa] | Additive Amount [parts by weight] | Soft Component Resin | Meso pentad Fraction [%] | MFR (230° C., 2.16 kg) [g/10 min] | Weight Average Molecular Weight (Mw) | Molecular Weight Distribution (Mw/Mn) | Melting Point [° C.] | Presence of Nanoized Nucleating Agent |
|---|---|---|---|---|---|---|---|---|---|
| Example 1 | 25 | 0.1 | PP | 20 | 30 | 10,000 | 2 | 80 | Absent |
| Example 2 | 25 | 20 | PP | 20 | 30 | 10,000 | 2 | 80 | Absent |
| Example 3 | 25 | 0.1 | PP | 60 | 30 | 10,000 | 2 | 80 | Absent |
| Example 4 | 25 | 0.1 | PP | 20 | 100 | 10,000 | 2 | 80 | Absent |
| Example 5 | 25 | 0.1 | PP | 20 | 30 | 500,000 | 2 | 80 | Absent |
| Example 6 | 25 | 20 | PP | 20 | 30 | 500,000 | 2 | 80 | Absent |
| Example 7 | 500 | 0.1 | PP | 20 | 30 | 10,000 | 2 | 80 | Absent |
| Example 8 | 500 | 20 | PP | 20 | 30 | 10,000 | 2 | 80 | Absent |
| Example 9 | 500 | 0.1 | PP | 60 | 30 | 10,000 | 2 | 80 | Absent |
| Example 10 | 500 | 0.1 | PP | 20 | 100 | 10,000 | 2 | 80 | Absent |
| Example 11 | 500 | 20 | PP | 60 | 100 | 10,000 | 2 | 80 | Absent |
| Example 12 | 500 | 0.1 | PP | 20 | 30 | 500,000 | 2 | 80 | Absent |
| Example 13 | 500 | 20 | PP | 20 | 30 | 500,000 | 2 | 80 | Absent |
| Example 14 | 500 | 0.1 | PP | 60 | 30 | 500,000 | 2 | 80 | Absent |
| Example 15 | 500 | 0.1 | PP | 20 | 100 | 500,000 | 2 | 80 | Absent |
| Example 16 | 500 | 20 | PP | 60 | 100 | 500,000 | 2 | 80 | Absent |
| Example 17 | 500 | 20 | PP | 60 | 100 | 500,000 | 2 | 80 | Present |
| Example 18 | 110 | 0.1 | PP | 55 | 50 | 130,000 | 2 | 80 | Absent |
| Example 19 | 110 | 5 | PP | 55 | 50 | 130,000 | 2 | 80 | Absent |
| Example 20 | 110 | 20 | PP | 55 | 50 | 130,000 | 2 | 80 | Absent |
| Example 21 | 110 | 20 | PP | 55 | 50 | 130,000 | 2 | 80 | Present |
| Example 22 | 110 | 20 | PP | 55 | 50 | 130,000 | 2 | 80 | Present (Unprocessed) |

TABLE 2

| Example/Comparative Example | Tensile Modulus [MPa] | Additive Amount [parts by weight] | Soft Component Resin | Meso pentad Fraction [%] | MFR (230° C., 2.16 kg) [g/10 min] | Weight Average Molecular Weight (Mw) | Molecular Weight Distribution (Mw/Mn) | Melting Point [° C.] | Presence of Nanoized Nucleating Agent |
|---|---|---|---|---|---|---|---|---|---|
| Comparative Example 1 | | | Did Not Add Low Crystalline PP | | | | | | Absent |
| Comparative Example 2 | 15 | 0.1 | PP | 10 | 150 | | | | Absent |
| Comparative Example 3 | 15 | 20 | PP | 10 | 150 | | | | Absent |
| Comparative Example 4 | 600 | 0.1 | PP | 80 | 15 | | | 160 | Absent |
| Comparative Example 5 | 600 | 20 | PP | 80 | 15 | | | 160 | Absent |
| Comparative Example 6 | 110 | 0.05 | PP | 55 | 50 | 130,000 | 2 | 80 | Absent |
| Comparative Example 7 | 110 | 30 | PP | 55 | 50 | 130,000 | 2 | 80 | Absent |

<Evaluation of Performance>

For the decorative sheet in each Example and the decorative sheet in each Comparative Example, film formability, reduction of crystallinity (degree of crystallinity), transparency, scratch resistance, and post-processability were evaluated.

The results are shown in Tables 3 and 4.

TABLE 3

| Example/Comparative Example | Film Formability | Reduction of Crystallinity | Transparency | Scratch resistance | Post-Processability |
|---|---|---|---|---|---|
| Example 1 | B | B | B | B | B |
| Example 2 | B | B | B | B | B |
| Example 3 | B | B | B | B | B |
| Example 4 | B | B | B | B | B |
| Example 5 | B | B | B | B | B |
| Example 6 | B | B | B | B | B |
| Example 7 | B | B | B | B | B |
| Example 8 | B | B | B | B | B |
| Example 9 | B | B | B | B | B |
| Example 10 | B | B | B | B | B |
| Example 11 | B | B | B | B | B |
| Example 12 | B | B | B | B | B |
| Example 13 | B | B | B | B | B |
| Example 14 | B | B | B | B | B |
| Example 15 | B | B | B | B | B |
| Example 16 | B | B | B | B | B |
| Example 17 | B | B | B | A | B |
| Example 18 | B | B | B | B | B |
| Example 19 | B | B | B | B | B |
| Example 20 | B | B | B | B | B |
| Example 21 | B | B | B | A | B |
| Example 22 | B | B | C | B | C |

The degree of crystallinity was calculated using equation 1 below from the absorption spectrum obtained in Fourier transform infrared spectroscopy. Here, in the equation 1, $I_{997}$ indicates a peak intensity at a wave number of 997 cm$^{-1}$, $I_{938}$ indicates a peak intensity at a wave number of 938 cm$^{-1}$, and $I_{973}$ indicates a peak intensity at a wave number of 973 cm$^{-1}$.

TABLE 4

| Example/Comparative Example | Film Formability | Reduction of Crystallinity | Transparency | Scratch resistance | Post-Processability |
|---|---|---|---|---|---|
| Comparative Example 1 | B | B | B | A | D |
| Comparative Example 2 | D | D | B | D | B |
| Comparative Example 3 | D | D | B | D | B |
| Comparative Example 4 | B | B | D | B | D |
| Comparative Example 5 | B | B | D | B | D |
| Comparative Example 6 | B | B | B | B | D |
| Comparative Example 7 | D | B | B | D | B |

[Film Formability]

The state of each transparent resin sheet was visually observed during melt extrusion.

The evaluation was conducted with the following two stages.
 B: Good (neck-in and film breakage were not observed)
 D: Poor (neck-in and film breakage were observed)

[Reduction of Crystallinity]

For the crystallinity, a degree of crystallinity was calculated at IR and then the value was compared with that in the case of not adding a low crystalline polypropylene resin (Comparative Example 1).

$$\text{Degree of Crystallinity} = \frac{I997 - I938}{I973 - I938} \qquad [\text{Math 1}]$$

The evaluation was conducted with the following two stages.
 B: Good (equivalent to or better than the degree of crystallinity in Comparative Example 1)
 D: Poor (worse than the degree of crystallinity in Comparative Example 1)

[Transparency]

Each transparent resin layer 3 thus produced was visually observed to evaluate the visibility of the pattern of the lower layer.

The evaluation was conducted with the following three stages.

B: Good (transparent)
C: No problem in the design properties but slightly opaque (level to be practically no problem)
D: Poor (opaque)

[Scratch Resistance]

Evaluation was made by pencil hardness test.

The testing method was in accordance with JIS-K5600, and the evaluation method was made as follows: A: The highest hardness of the surface of the transparent resin layer 3, when not dented, was HB or greater; B: The highest hardness of the surface of the transparent resin layer 3, when not dented, was 2B or greater; and D: The highest hardness of the surface of the transparent resin layer 3, when not dented, was 3B or lower.

[Post-Processability]

Evaluation was made by V groove bending suitability test.

A detailed method of the V groove bending suitability test will be described as follows.

First, on one side of a medium-density fiberboard (MDF) configuring the substrate B, each decorative sheet 1 prepared as described above was bonded using a urethane-based adhesive, and a V-shape groove was formed in the other side of the substrate B so that it reaches the boundary where the substrate B and the decorative sheet 1 are bonded to each other and in such a manner that the decorative sheet 1, which is opposite to the other side of the substrate B, is not damaged. Next, the substrate B is bent to 90 degrees along the V-shaped groove so that the apex comes to the surface of the decorative sheet 1. The bent part of the surface of the decorative sheet 1 is observed with an optical microscope to detect whitening or cracking, thereby evaluating its post-processing resistance.

The evaluation was conducted with the following three stages.

B: No whitening or cracking observed
C: Slight whitening and cracking were observed but there is no practical problem
D: Whitening and cracking were observed to the extent not acceptable as a decorative sheet.

As seen from Tables 3 and 4, in Examples, the low crystalline polypropylene resin was added to give flexibility and also good scratch resistance. This is considered to be because, since no reduction of the degree of crystallinity was observed, the low crystalline polypropylene resin selectively enters an amorphous portion of the highly crystalline polypropylene resin. The scratch resistance and the post-processability were thus considered to be balanced.

In contrast, in the decorative sheet of Comparative Example 1, it will be seen that whitening occurred upon the V groove processing.

In the decorative sheet of Comparative Example 2, neck-in occurred during melt extrusion, which causes deficiencies in film formation. Further, the above decorative sheet was excessively soft, and thus the scratch resistance was deteriorated.

In the decorative sheet of Comparative Example 3, neck-in occurred during melt extrusion, which causes deficiencies in film formation. Further, the above decorative sheet was excessively soft, and thus the scratch resistance was deteriorated.

In the decorative sheet of Comparative Example 4, whitening occurred upon the V groove processing.

In the decorative sheet of Comparative Example 5, whitening occurred upon the V groove processing.

In the decorative sheet of Comparative Example 6, the low crystalline polypropylene resin was added in an excessively little amount, and thus the post-processability was not improved, that is, the sheet was whitened.

In the decorative sheet of Comparative Example 7, the low crystalline polypropylene resin was added in an excessively large amount, and thus neck-in occurred during melt extrusion and also the scratch resistance was deteriorated due to the excessively soft resin.

REFERENCE SIGNS LIST

1 . . . Decorative sheet; 2 . . . Surface protective layer; 3 . . . Transparent resin layer; 3a . . . Embossed pattern; 4 . . . Adhesive layer; 5 . . . Pattern layer; 6 . . . Substrate layer; 7 . . . Concealing Layer; 8 . . . Primer Layer; B . . . Substrate.

What is claimed is:

1. A decorative sheet, comprising:
a transparent resin layer containing a highly crystalline polypropylene resin as a main component,
wherein the transparent resin layer is formed by adding a nanoscale nucleating agent to the highly crystalline polypropylene resin,
wherein the nucleating agent is a nucleating agent vesicle having a single layer outer membrane containing a nucleating agent, and
wherein the transparent resin layer contains a low crystalline polypropylene resin added to the transparent resin layer in a range of 0.1 part by mass or more and 20 parts by mass or less relative to 100 parts by mass of a highly crystalline polypropylene resin, the low crystalline polypropylene resin having a tensile modulus in a range of 25 MPa or more and 500 MPa or less.

2. The decorative sheet of claim 1,
wherein the low crystalline polypropylene resin has a meso pentad fraction in a range of 20% or more and 60% or less.

3. The decorative sheet of claim 1,
wherein the low crystalline polypropylene resin has a melt flow rate (MFR) at 230° C. in a range of 30 g/10 min or more and 100 g/10 min or less.

4. The decorative sheet of claim 1,
wherein the low crystalline polypropylene resin has a mass-average molecular weight (Mw) in a range of 10,000 or more and 500,000 or less.

5. The decorative sheet of claim 1,
wherein the low crystalline polypropylene resin has a molecular weight distribution (Mw/Mn) of less than 4.

6. The decorative sheet of claim 1,
wherein the low crystalline polypropylene resin has a melting point in a range 0° C. or more and 120° C. or less, the melting point being defined as a peak top of a peak observed on a highest temperature side of a melting endothermic curve obtained by being held at −10° C. for five minutes under a nitrogen atmosphere using a differential scanning calorimeter (DSC), followed by a temperature rise at 10° C./min.

7. The decorative sheet of claim 1,
wherein the nucleating agent is contained in a vesicle by supercritical reverse phase evaporation.

8. A method of producing the decorative sheet of claim 1, wherein the transparent resin layer is formed by adding a nanoscale nucleating agent to the highly crystalline polypropylene resin, wherein the nucleating agent is a nucleating agent vesicle having a single layer outer membrane containing a nucleating agent.

9. The method of producing the decorative sheet of claim 8, wherein the nucleating agent is contained in a vesicle by supercritical reverse phase evaporation.

* * * * *